July 29, 1969
P. WARNICK
3,458,178
SMUDGE COLLECTOR
Filed March 20, 1967
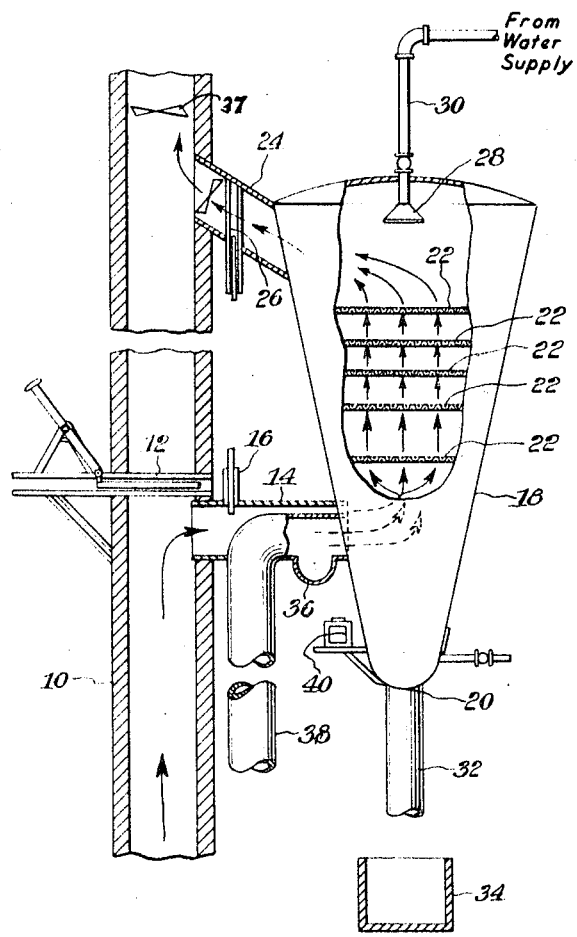
INVENTOR.
PHILIP WARNICK

United States Patent Office 3,458,178
Patented July 29, 1969

3,458,178
SMUDGE COLLECTOR
Philip Warnick, 228 W. 25th St.,
New York, N.Y. 10001
Filed Mar. 20, 1967, Ser. No. 624,315
Int. Cl. B01d 47/12, 47/06
U.S. Cl. 261—17    1 Claim

ABSTRACT OF THE DISCLOSURE

Apparatus for removing smudge particles from exhaust gases flowing through a chimney. A hollow cone having screens, a water spray positioned above the screens to direct water downward through the screens to wash collected particles therefrom and means below the bottom of the cone to collect the particles and water. A gas inlet and outlet, each having a damper, connects the chimney to the cone. The screens have graduated openings with the opening size decreasing with increasing screen elevation. The gas inlet has a water trap for preventing the water from flowing therethrough. A fan is positioned in the chimney above the gas inlet for drawing fumes through the chimney. Means are provided for vibrating the screens to remove particles therefrom and exhaust gas is feed into the cone below the screens.

Summary of the invention

Exhaust gases from furnaces and the like contain solid particles (smudge) which, if not removed prior to discharge to the atmosphere of the gases, can create smog and other hazards.

In my invention, exhaust gases containing such particles are by-passed around a portion of the chimney and are directed upward through a downwardly pointing hollow cone through a succession of screens wherein the particles are trapped. Water sprayed downward on the screens washes the trapped particles downward to a suitable collector. Thus the particles are removed from the exhaust gases before these gases are returned to the chimney (at a higher point than the particle containing gases were taken from the chimney).

Brief description of the drawing

The attached figure is a side view in cross section of one form of my invention.

Detailed description of preferred embodiment

A vertical chimney 10 contains a horizontal normally closed damper 12. A first horizontal hollow feed pipe 14, containing a normally open damper 16, connects the chimney at a point below damper 12 a hollow vertical downwardly pointing cone 18 at a point adjacent but above the bottom end 20. Disposed in the cone above pipe 14 are a succession of five horizontal screens 22 vertically spaced apart, each screen having a differently sized opening, the screens being arranged with the screen of largest opening on the bottom and the other screens so disposed that the opening size decreases as the elevation of each screen increases.

A second inclined hollow feed pipe 24, containing a normally open damper 26, connects the cone 18 at a point above the screens to the chimney at a point above damper 12. A water spray head 28 connected to water line 30 and disposed somewhat above the screens directs the spray downwardly through the screens to wash the particles thereon downward through a vertical discharge pipe 32 at the bottom end of the cone to a suitable collector 34. A water trap 36 prevents water from flowing into pipe 14, while a fan 37 helps draw the fumes through the flue 10.

Thus as the particle containing gases pass from the chimney through pipe 14, the screens and back through pipe 24 into the chimney, the smudge particles are removed.

If desired exhaust gases from an incinerator can also be fed directly therefrom into the cone via pipe 38 for removal of smudge. An electric vibrator 40 can vibrate the screens and increase the efficiency of particle removal from the screens.

I claim:
1. Apparatus for removing smudge particles from exhaust gases flowing upward through a chimney, said apparatus comprising a vertical hollow cone having its apex pointed downward; a vertical discharge pipe connected to the apical end of the cone; screen means in said cone for collecting said particles; water spray means in the top end of said cone to spray the collected particles downward from said screen means; particle collection means disposed at the bottom end of the cone to receive said sprayed collected particles; first means connecting said chimney to said cone adjacent but below said screen means to direct said particles containing gases thereinto; and second means connecting said cone at a point above the collection means to said chimney to return the particle free gas thereto; said first means being a hollow tube connected to a first point in the chimney; said second means also being a hollow tube connected to a second and higher point in the chimney, each tube having a separate damper; said screen means including a plurality of horizontal screens which are vertically spaced apart and are disposed one on top of another; said screens having graduated openings, the opening size decreasing with increasing screen elevation; means defining a water trap in said first means for preventing water from flowing into said first means; a fan in the chimney above the first means for drawing fumes through the chimney; means for vibrating the screens for removing particles therefrom; and means feeding exhaust gases into the cone below the screens.

References Cited

UNITED STATES PATENTS

| 736,294 | 8/1903 | Ogle | 261—17 |
| 1,063,320 | 6/1913 | Bayer | 216—106 |
| 2,508,618 | 5/1950 | Miner | 261—106 |
| 2,694,042 | 11/1954 | Tapleschay et al. | 261—115 X |

FOREIGN PATENTS 1,141,043  12/1962  Germany.

RONALD R. WEAVER, Primary Examiner

U.S. Cl. X.R.

23—277; 55—300; 261—24, 106, 126